Feb. 19, 1952   R. A. LAKE   2,586,669
FIXED MESSAGE INSERTER
Filed Dec. 20, 1949   2 SHEETS—SHEET 1
FIG. 1
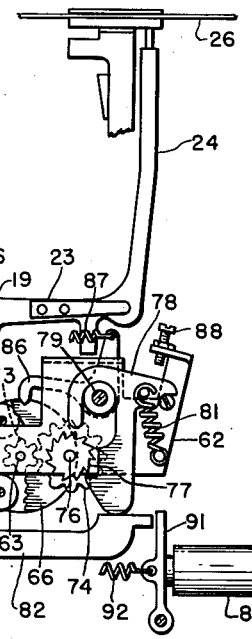
FIG. 2
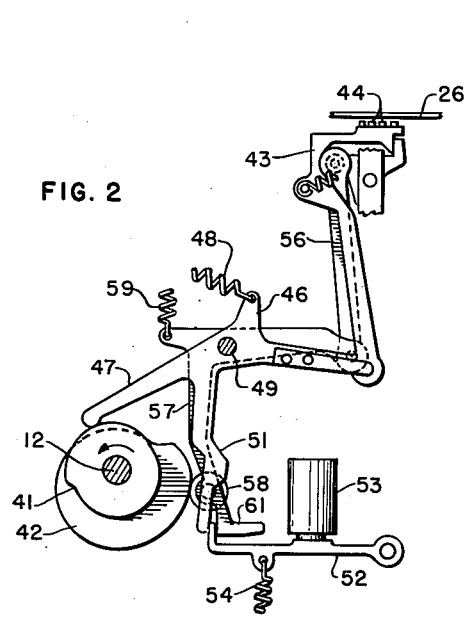
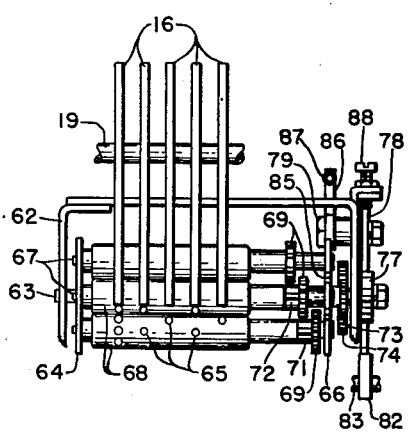
FIG. 3
INVENTOR
ROSS A. LAKE
BY Emery Robinson
ATTORNEY Patented Feb. 19, 1952

2,586,669

UNITED STATES PATENT OFFICE 2,586,669

FIXED MESSAGE INSERTER

Ross A. Lake, Oak Park, Ill., assignor to Teletype Corporation, Chicago, Ill., a corporation of Delaware Application December 20, 1949, Serial No. 134,066

10 Claims. (Cl. 178—17)

The present invention relates to printing telegraph apparatus and more particularly to apparatus for introducing message numbering, identifying signals, or other intelligence into messages or between consecutive messages.

It is well known in the printing telegraph art to use numerical identifications as a method of identifying messages. However, the practice of having an operator type out the message numbering signals as a part of the original message is inconvenient and leads to numerous errors, such as the same identifying number being utilized on consecutive messages due to an operator's neglecting to check off a number on a check list after it has once been used, etc.

To avoid the inconveniences attending the manual insertion of message numbering signals into or between messages, attempts have been made to utilize auxiliary transmitters for this purpose. In general such auxiliary numbering transmitters consist of a regular message transmitter modified so as to respond to a certain predetermined signal, and upon such response a previously prepared control form causes a numerical identification signal to be transmitted. This method has proved satisfactory, however, it involves the expense of an additional transmitter at each transmitting station.

In the copending application of F. Martindell, Serial No. 134,007, filed December 20, 1949, now U. S. Patent No. 2,545,207 of March 13, 1951, there is shown a control device suitable for application to a tape transmitter of the type shown in the patent to M. T. Goetz, No. 2,296,845. In that control device a rotatable unit having a plurality of planetary numbering cams is positioned above the tape sensing pins. The device also may be coded with different fixed control indicia. In the normal stop position of the device, in accordance with the well known five unit Baudot code, a Letters control indicia is positioned above the tape sensing pins. This Letters signal, consisting of all five marking units, therefore presents no obstacle to the tape sensing pins in sensing the message tape. Thus the message tape signals are transmitted until a control signal in the tape actuates mechanism to start the stepping of the numbering device. Immediately following the control signal sequence in the message tape a Letters or all marking signal in the tape is moved above the tape sensing pins. Thus the pins may extend through the tape and sense the numbering cams as the unit is stepped through its successive positions. Upon the completion of transmission of the numbering sequence a control signal or sequence is sensed among the fixed control indicia in the device and the tape sensing mechanism is reactivated. The device is then stepped to its normal stop position with a Letters signal opposite the sensing pins and the message is transmitted. Provision is made for individually advancing the numbering cams in order that consecutive number signals will be transmitted upon successive operations of the numbering device.

The principal object of the present invention is to provide a pivoted transmitter of the general type shown in the patent to R. A. Lake, 2,262,012, issued November 11, 1941, and of the specific type shown in the patent to E. A. Gubisch, 2,348,214, issued May 9, 1944, with a numbering or fixed message control device similar to that shown in the afore-mentioned copending application of F. Martindell.

For a complete understanding of the transmitter with which the present invention deals, reference should be made to the afore-mentioned patents to R. A. Lake and E. A. Gubisch, the disclosures of which patents are hereby incorporated into the present disclosure by reference. Accordingly only the parts of the transmitters shown in said patents as are deemed necessary to a thorough understanding of the present invention are shown in the present disclosure.

Detailed objects and advantages, although not recited specifically will be apparent or will present themselves and the invention will be more readily comprehended from the following detailed description when read in conjunction with the accompanying drawings, wherein:

Fig. 1 is a fragmentary side view showing the principal parts of the invention;

Fig. 2 is a fragmentary schematic view of the tape feed mechanism;

Fig. 3 is a detail view of the numbering control device; and

Figure 4:
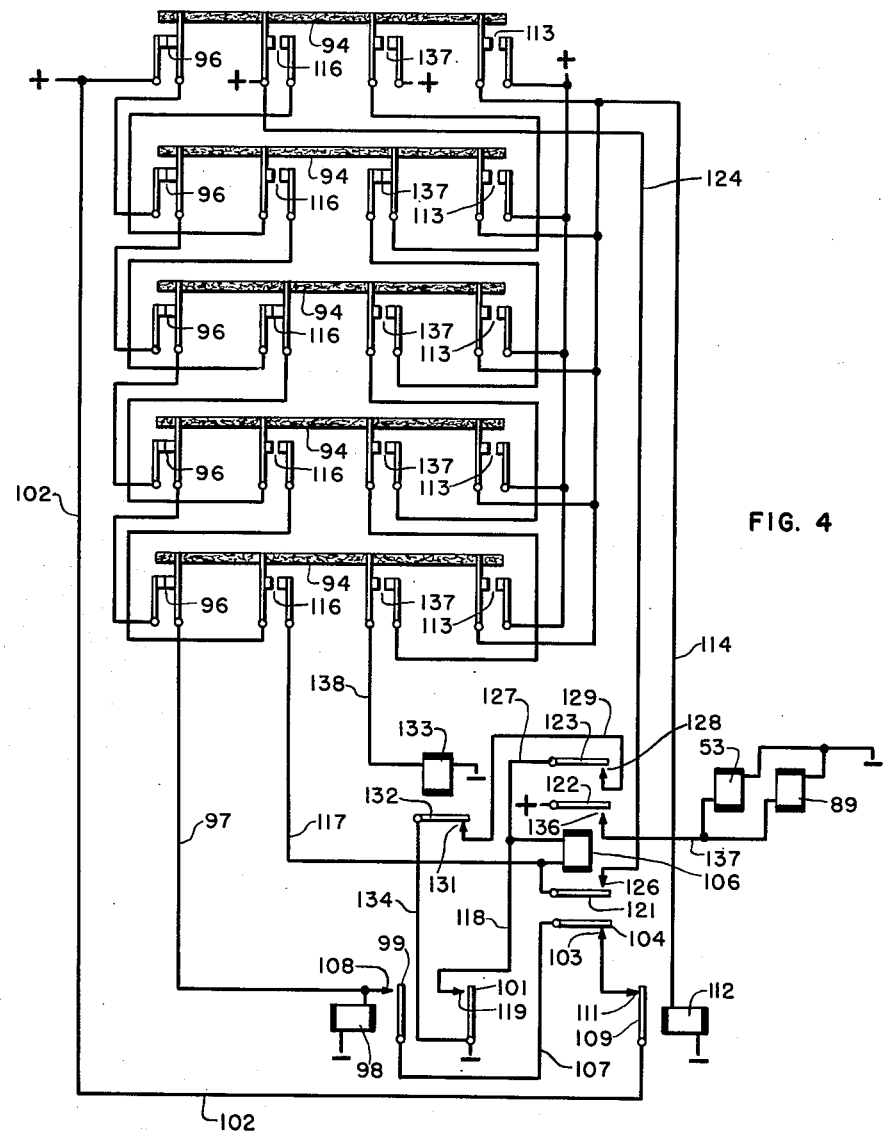
Fig. 4 is a schematic diagram of the electric circuit utilized by the invention.

Referring now to the drawings a power gear 11 supplies rotational power to a shaft 12 through the medium of a meshing gear 13. The power gear 11 corresponds to the gear 214 in the afore-mentioned patent to E. A. Gubisch. Secured to the shaft 12 and rotatable therewith are five cams 14 which control corresponding four-armed levers 16 through a follower 17 on an arm 18 on each of the four-armed levers 16. The four-armed levers 16 are mounted for pivotal movement on a common shaft 19 and a spring 21 on a projection on an arm 22 on each of the levers retains the followers 17 in engagement with the cams 14. Another arm 23 on each of the four-armed levers 16 has a sensing pin 24 suitably pivoted thereto which sensing pin 24 is adapted to sense the perforations in a message tape 26 in a well known manner. The sensing pins 24 correspond to the sensing pins 175 in the afore-mentioned Gubisch patent.

As the cams 14 rotate so as to bring the low parts thereof opposite the follower 17, in any position of the tape 26 when the corresponding sensing pin 24 senses a perforation, such pin 24 will rise and thereby permit the four-armed lever 16 to pivot counter-clockwise under the urging of spring 21. Likewise if a sensing pin 24 does not sense a perforation in the tape 26 the pin will not be permitted to rise under the urging of spring 21 and the four-armed lever 16 will remain substantially in the same position as shown.

The shaft 12 also carries a cam 27 with which a follower roller 28 on a bell crank 29 cooperates. The bell crank 29 is mounted pivotally on a bolt 31 secured to a portion 32 of the main frame. The bell crank 29 has an extension arm 33 which carries a plurality of sword levers 34 mounted pivotally on a bolt 36. The swords 34 each have an upper arm 37 which is adapted to cooperate with the arm 22 on a corresponding four-armed lever 16, and also a lower arm 38 which is adapted to cooperate with the arm 18 on the corresponding four-armed lever.

When a sensing pin 24 senses a spacing signal or nonperforated portion of the tape 26, as was stated previously the four-armed lever corresponding thereto remains in substantially the position shown in Fig. 1, and thereafter as the follower 28 rides up the high portion of the cam 27, the bell crank 29 and extension arm 33 are pivoted clockwise and the sword 34 is moved to the right. The arm 22, being in the position shown, blocks the arm 37 and as the sword moves further to the right it is pivoted counterclockwise on the bolt 36. A ball portion 39 on the sword 34, at this time, operates a lever not shown, which in turn causes operation of a contact preparatory to the transmission of a spacing signal. Any sensing lever 24 that senses a marking signal or perforation in the tape 26, moves upwards into such perforation when enabled so to do, as the follower 17 falls off the high portion cam 14. The corresponding four-armed lever is pivoted counterclockwise under the urge of its spring 21, and the arm 18 is moved downwardly opposite the corresponding sword arm 38. Subsequently when the bell crank 29 is pivoted clockwise as the roller 28 rides to the high portion of the cam 27, the sword 34 is moved to the right and upon the lower arm 38 striking the arm 18 on the four-armed lever 16, the sword 34 is pivoted clockwise slightly, thereby causing the ball portion 39 to move its cooperating lever (not shown) in a manner to transmit a marking or current impulse.

Referring now to Fig. 2 the tape advancing mechanism will be described briefly. The shaft 12 has a pair of cams 41 and 42 which control the feed mechanism for the tape 26. The cam 41 controls a member 43 which corresponds to the member 126 in the afore-mentioned patent to R. A. Lake, which member 43 carries a plurality of tape pulling pins 44 adapted to enter the feed holes in the tape 26. The member 43 is pivotally secured in a suitable manner to a three-armed lever 46 which has a follower arm 47 cooperating with the cam 41 and which lever 46 is also urged continuously in a counterclockwise direction by a spring 48 about its pivot shaft 49. It will be noted that when the follower arm 47 rides the high portion of the cam 41 the pins 44 are withdrawn from the tape 26. The three-armed lever 46 has an arm 51 which cooperates with an armature 52 of a control magnet 53. Normally a spring 54 retains the armature 52 in a downward position disengaged from the arm 51, but when the control magnet 53 is energized the armature 52 is pulled up by the magnet 53 and thereby blocks the three-armed lever 46 in its clockwise position with the pins on the member 43 disengaged from the tape 26.

The cam 42 controls a member 56 which corresponds to the member 132 in the afore-mentioned patent to R. A. Lake. When the member 56 is reciprocated by the cam 42 the pins 44 are caused to step the tape 26 one step to the left. The member 56 is secured pivotally to a bell crank lever 57 mounted pivotally on the shaft 49. The bell crank lever 57 has a follower roller 58 which is continuously urged towards the cam 42 by a spring 59. The bell crank lever 57 has a foot 61 which cooperates with the aramature 52 of the control magnet 53. Thus when the control magnet 53 is energized so as to pull up its armature 52, the armature is effective to prevent any operative engagement of either the three-armed lever 48 or bell crank lever 57 with their respective control cams 41 and 42, and thus the tape 26 will remain stationary so long as the control magnet 53 remains energized.

The number or fixed message inserter will now be described. A bracket 62 is suitably mounted in the transmitter and supports the number inserter on a rotatable shaft 63. A pair of discs 64 and 66 are secured to the shaft 63 and themselves support a plurality of shafts 67 on each of which is mounted a code drum 68. These code drums 68 each have ten individual positions, each position being coded with apertures 65 representing a numeral designation. If it is desired to have only two or three numbering code drums 68 the remainder of the space around the discs 64 and 66 may be covered with a segment of a cylindrical sleeve (not shown) which itself may be coded in any desired manner with some fixed message code.

The code drums 68 are adapted to be advanced one step during each revolution of the planetary unit between the discs 64 and 66 in order to provide successive numerical designations upon successive sensing of the code drums 68. Each code drum 68 has an associated stepping gear 69. The gear 69 corresponding to the code drum 68 in the units position cooperates with an adjustable screw 70 suitably mounted in the bracket 62. During each revolution of the discs 64 and 66, the screw 70 engages a tooth in the gear 69 on the units code drum shaft, and thereby causes the units code drum 68 to be stepped to its next successive numerical position. Associated with the gear 69 on the units code drum shaft is a single toothed gear 71 which is designed to mesh with the gear 69 on the tens code drum shaft. Thus, inasmuch as there are ten teeth in the gears 69, that is a tooth for each coded digit on the code drums 68 the gear 71 is effective to step the tens code drum 68 once during each ten steps or single revolution of the units code drum 68. Likewise a single toothed gear 72 is also provided on the tens code drum shaft 67, and is effective to advance the hundreds code drum 68 one step for each ten steps or single revolution of the tens code drum. In the mechanism shown there are seven stop positions of the numbering mechanism and thus there could be up to seven code drums 68 spaced between the discs 64 and 66.

The main shaft 63 which carries the numbering mechanism has a toothed gear 73 secured thereto which meshes with a gear 74 mounted on a shaft 76 rotatable in a suitable collar (not shown) in the bracket 62. Also mounted on the shaft 76 is a stepping ratchet 77. A stepping pawl 78 which is provided for stepping the ratchet 77 is pivotally mounted on a guide post 79 and is adapted to reciprocate vertically. A spring 81 urges the pawl 78 clockwise about the post 79 until the pawl strikes the ratchet 77. When a lever 82 which is mounted pivotally on a shaft 83 is moved counterclockwise in response to the action of a cam 84 on the shaft 12 the pawl 78 moves upwardly thereby advancing the ratchet 77 a step which in turn steps the numbering device a step through the medium of the gears 73 and 74. A detent 86 in the form of a bell crank mounted pivotally on the post 79 is spring urged counterclockwise (Fig. 1) by a spring 87 towards the disc 66. The disc 66 has a plurality of notches 85, one being provided for each stop position of the numbering device. Thus the numbering device is retained in each position to which it is stepped by the stepping pawl 78. A stop screw 88 is provided for preventing the lever 82 from throwing the pawls 78 too far as it is moved counterclockwise by the cam 84.

It will be noted that a magnet 89 is provided for controlling the stepping of the numbering device. So long as the magnet 89 is energized its armature 91 remains pulled up against the urging of the spring 92. However, when the magnet 89 is de-energized the spring 92 urges the armature 91 to the left. Under this condition when the cam 84 causes the lever 82 to be pivoted so as to operate the pawl 78, the armature 91 slips beneath the lever 82 and prevents the spring 81 from being effective to return the pawl 78 to its lower position.

In the operation of the present invention the magnets 53 and 89 are energized substantially simultaneously. It will be recalled that when the magnet 53 is energized the tape 26 will not be fed but that a Letters, or all perforated, indicia in the tape 26 will be in sensing position. Thus when the sensing pins 24 are permitted to sense the tape 26 under this condition they are all free to rise up through the perforations in the tape. At this time sensing pins 95 on an arm 93 on each of the four-armed levers 16 sense either the numbering code drums 68 or the cylindrical sleeve coded with the fixed message. For the purposes of the present disclosure it will be assumed that the last code in the cylindrical sleeve is a Letters or all perforation code. Therefore, when the sensing of the message tape 26 is resumed there will be nothing to block the sensing pins 95.

In the following description of the operation of the invention reference will be made particularly to Fig. 4. A group of insulator members 94 are provided which are designed to be controlled by the five sword levers 34 through intermediate levers (not shown). In response to a marking signal the insulators 94 are moved to the right, whereas the sword levers 34 move the insulators 94 to the left (the position shown) in response to a spacing signal. For the purpose of the present disclosure the signals Blank followed by Figures have been chosen as the signals for initiating operation of the numbering device and the single signal X has been chosen as the signal to initiate operation of the message transmitting mechanism after transmission of the numbering sequence. Obviously any other signal sequence could be chosen to perform these functions.

When the Blank signal is sensed in the tape 26, such signal consisting of five spacing impulses, the swords 34 cause all of the insulators 94 to be positioned as shown and thus a circuit may be traced from positive battery through the five contacts 96, over a lead 97, through a relay 98, to negative battery. The relay 98 pulls up its two armatures 99 and 101 and a locking circuit for the relay 98 is established which extends from positive battery, through an armature 109 and back contact 111 of a relay 112, through a back contact 103 and armature 104 of a relay 106, over a lead 107, through the armature 99 and a front contact 108 of relay 98, through the relay 98, to negative battery. It is to be noted that when a Blank signal is sensed in the tape 26, none of a group of contacts 113 is closed and therefore the armature 109 and back contact 111 of the relay 112 are closed. Upon the receipt of any other signal following the Blank one of the contacts 113 closes and a circuit to the relay 112 is established from positive battery through one of the contacts 113, over a lead 114, through the relay 112, to negative battery. The locking circuit for the relay 98 is therefore broken when the armature 109 is pulled up.

Upon the sensing of a Figures signal immediately following a Blank a circuit is established from positive battery through a group of contacts 116, over a lead 117, through the relay 106, over a lead 118, through a front contact 119 and armature 101, to negative battery. The relay 106 attracts its armatures 104, 121, 122, and 123, thereby breaking the locking circuit for the relay 98, and establishing its own locking circuit. The locking circuit for relay 106 extends from positive battery, over a lead 124, over a front contact 126 and the armature 121, through the relay 106, over a lead 127, through the armature 123, and front contact 128, over a lead 129, through a back contact 131 and armature 132 of a relay 133, over a lead 134, to negative battery. Energization of the relay 106 also causes the armature 122 to close against a front contact 136, thus completing a circuit for the control relays 53 and 89, from positive battery, through the closed armature 122 and contact 136, over a lead 137, through the control relays 53 and 89 to negative battery. Thus the tape 26 will be stopped and the numbering device will control transmission.

At the end of the numbering sequence a fixed control signal that is never transmitted in the body of the numbering sequence is transmitted. This control signal has been arbitrarily chosen as X in the present description. Upon the transmission thereof the swords 34 position the insulators in a permutation of positions whereby a plurality of contacts 137 are closed. At this time a circuit is established from positive battery through the contacts 137, over a lead 138, through the relay 133, to negative battery. The energization of the relay 133 causes it to pull up its armature 132 and thereby break the previously traced locking circuit for the relay 106. When the locking circuit for the relay 106 is broken the magnets 53 and 89 are de-energized and thus the numbering device is stopped and transmission of the message in the tape 26 is resumed. It will be recalled that the numbering device is stopped with a Letters code opposite the sensing pins 95. Immediately after the X signal this Letters code is stepped into position opposite the sensing pins 95 and thereafter the magnets 53 and 89 are de-energized.

By the present invention applicant has provided an efficient device for enabling the automatic insertion of numbering or other signals without the necessity of providing a separate transmitting device. Numerous changes may be made without departing from the spirit or scope of the present invention.

What is claimed is:

1. In combination with a telegraph transmitter having pivoted tape sensing levers, a first group of sensing pins mounted on said sensing levers for sensing a message tape, interponents for carrying said sensing levers, transmitting contact actuating levers controlled by said interponents, a numbering device, a second group of sensing pins on said interponents for sensing said numbering device, means responsive to a special signal combination sensed by said first group of sensing pins in said message tape for actuating said second group of sensing pins to thereby cause said transmitting contact actuating levers to transmit a special numbering sequence, and means responsive to a different special signal sensed by said second group of sensing pins for actuating said first group of sensing pins to again sense said message tape and for stopping the operation of said sensing pins in sensing said second group of numbering device.

2. In combination with a telegraph transmitter having pivoted tape sensing levers, interponents for carrying said sensing levers, transmitting contact actuating levers controlled by said interponents, a numbering device having numerical permutations thereon, means for advancing the numbering device, means for normally rendering said advancing means ineffective, sensing pins on said interponents for sensing said numbering device, electro-magnetic means responsive to a special signal combination sensed by said sensing levers in a message tape for rendering effective said numbering device advancing means to thereby cause said transmitting contact actuating means to transmit a special numbering sequence, and relay means responsive to a different special signal sensed by said sensing pins for de-energizing the electro-magnetic means whereby said pivoted tape sensing levers again sense said message tape and the operation of said numbering device advancing means is rendered ineffective.

3. In an automatic transmitting device, a plurality of sensing levers for sensing a message tape, a tape advancing means for bringing successive signals into tape sensing position, an equal number of interponents controlled in accordance with signals sensed by said sensing levers, an equal number of signal transmitting levers controlled by said interponents, a message inserter, sensing pins on said interponents for sensing said message inserter, said interponents thereby controlling said transmitting levers in accordance with signals impressed on said message inserter, means responsive to a special signal group in said message tape for stopping said message tape and enabling said sensing levers to freely pass through perforations in said message tape, said special signal group responsive means being further effective to initiate operation of said message inserter whereby said sensing pins sense said message inserter and thereby control said interponents in accordance with signals impressed thereon, and further means responsive to a signal group in said message inserter for stopping said message inserter whereby said interponents are no longer controlled thereby and for actuating said message tape advancing means whereby said interponents are controlled by said message tape.

4. In an automatic signal transmitting device, a plurality of sensing levers for sensing a message tape, said message tape containing permutations of perforations coded to represent intelligence signals, means for transferring said intelligence signals sensed by said sensing levers to a group of transmitting levers, means for stepping said message tape to bring successive permutations of perforations into position to be sensed by said sensing levers, a rotatable device coded with permutations of perforations indicative of fixed message signals, a plurality of sensing pins for sensing said permutations of perforations in said device and thereby rendering said transferring means effective to transfer the fixed message signals to said transmitting levers, means operable in response to a predetermined code group sensed by said sensing levers and transferred to said transmitting levers for rendering said tape stepping means ineffective after stepping said tape to an all perforated position and for initiating operation of said sensing pins and rotating said rotatable device, and means operable in response to a special signal group sensed by said sensing pins for rendering said sensing pins ineffective and rendering said tape stepping means effective and said sensing levers effective to again sense said message tape.

5. In a telegraph message transmitter, a rotatable message identifying device, a portion of said device being coded with a plurality of permutations of perforations designating fixed identifying signals and one or more fixed control signals, a plurality of planetary code drums occupying another portion of said device, each of said code drums having a plurality of permutations of perforations corresponding to digits 0 to 9, inclusive, a plurality of interponents carrying sensing levers for sensing a message tape, tape advancing means for advancing said message tape to enable said sensing levers to sense successive permutations of perforations in said message tape, a plurality of sensing pins carried by said interponents for sensing all of said permutations of perforations in said device including said code drums, means for rotating said device to bring successive ones of its permutation of perforations into position to be sensed by said sensing pins, means for individually rotating said planetary code drums to bring permutations of perforations corresponding to different digits into sensing position during successive rotations of said device, means responsive to a special permutation of perforations in said message tape for initiating rotation and sensing of said device and stopping said tape advancing means, and means responsive to said permutations designating control signals in said device for stopping rotation and sensing of said device and initiating sensing and advancing of said message tape.

6. In a telegraph message transmitter, a rotatable message identifying device, a portion of said device being coded with a plurality of permutations of perforations designating fixed identifying signals and one or more fixed control signals, a plurality of planetary code drums occupying another portion of said device, each of said code drums having a plurality of permutations of perforations corresponding to digits 0 to 9, inclusive, a plurality of interponents carrying sensing levers for sensing a message tape, tape advancing means for advancing said message tape to enable said sensing levers to sense successive permutations of perforations in said message tape, a plurality of sensing pins carried by said interponents for sensing all of said permutations of perforations in said device including said code drums, means for rotating said device to bring successive ones of its permutations of perforations into position to be sensed by said sensing pins, means for individually rotating said planetary code drums to bring permutations of perforations corresponding to successive numeral identifying signals into sensing positions during successive rotations of said device, means responsive to a special permutation of perforations in said message tape for initiating rotation and sensing of said device and stopping said tape advancing means, and means responsive to said permutations designating control signals in said device for stopping rotations and sensing of said device and initiating sensing and advancing of said message tape.

7. In a telegraph message transmitter, a rotatable message identifying device, a plurality of planetary code drums in said device each having a plurality of code holes corresponding to digits 0 to 9, inclusive, said device also having a plurality of code holes designating control signals, a plurality of interponents carrying sensing levers for sensing code holes in a message tape, tape advancing means for advancing said message tape to enable said sensing levers to sense successive permutations of said code holes in said message tape, a plurality of sensing pins carried by said interponents for sensing said code holes in said device including said code drums, means for rotating said device to bring successive permutations of code holes therein into position to be sensed by said sensing pins, means for individually rotating said planetary code drums to bring permutations of code holes corresponding to successive numeral identifying signals into sensing position during successive rotations of said device, means responsive to a special permutation of code holes in said message tape for initiating rotation and sensing of code holes in said device and stopping said tape advancing means, and means responsive to said code holes in said device, designating control signals for stopping rotation and sensing of said device and initiating sensing and advancing of said message tape.

8. In a telegraph message transmitter, a rotatable message identifying device, a plurality of planetary code drums in said device each having a plurality of code holes corresponding to digits 0 to 9, inclusive, said device also having a plurality of permutations of code holes designating control signals, one of said permutations of code holes designating control signals consisting of code holes in all code positions, a plurality of interponents carrying sensing levers for sensing code holes in a message tape, means for advancing said message tape to enable said sensing levers to sense successive permutations of code holes in said message tape, a plurality of sensing pins carried by said interponents for sensing code holes in said device, means for rotating said device to bring successive permutations of code holes therein into position to be sensed by said sensing pins, means for individually rotating said planetary code drums to bring permutations of code holes corresponding to different digits into sensing position during successive rotations of said device, means responsive to a special permutation of code holes in said message tape for initiating rotation and sensing of said device and stopping said tape advancing means whereby said sensing levers continuously sense a permutation of code holes in said message tape consisting of code holes in all code positions, and means responsive to said permutation of code holes in said device designating said control signals for initiating advancing and sensing of said message tape and stopping rotation of said device in a position with said sensing pins opposite said permutation of code holes consisting of code holes in all code positions.

9. In combination with a telegraph transmitter, means for advancing a permutated tape therethrough, a device having numerical permutations thereon, means to advance the numbering device, a first sensing means for sensing the permutations in the tape, a second sensing means for sensing the permutations in the numbering device, interponents positioned by either of said sensing means, transmitting contact actuating means controlled in accordance with the position of the interponents, means controlled by the permutations in the tape for rendering said first sensing means ineffective and said second sensing means effective, and means controlled by the permutations in the numbering device for rendering the second sensing means ineffective and said first sensing means effective.

10. In combination with a telegraph transmitter, a plurality of levers for sensing permutated tape, a device having numerical permutations thereon, sensing pins adapted to be positioned in accordance with said numerical permutations, interponents adapted to be positioned by either the sensing levers or the pins transmitting contact actuating levers controlled by said interponents, means to advance the device to present the numerical permutations to the sensing pins, means to advance the permutated tape past the sensing levers, means to prevent the advance of the numerical device whereby the interponents are positioned by the sensing levers, electromagnetic means actuated by a special signal in the permutated tape for simultaneously rendering the tape advancing means ineffective and for removing the means preventing the advancement of the device whereby the interponents are positioned by the sensing pins, and electrical relay means energized by a special signal permutation in the numbering device for de-energizing the electro-magnetic means to again permit the interponents to be positioned by the sensing levers.

ROSS A. LAKE.

REFERENCES CITED

The following references are of record in the file of this patent:

UNITED STATES PATENTS

| Number | Name | Date |
| --- | --- | --- |
| 2,451,045 | Potts | Oct. 12, 1948 |